No. 743,031. PATENTED NOV. 3, 1903.
G. T. PRATT.
INSULATING MATERIAL.
APPLICATION FILED JAN. 24, 1902.
NO MODEL.
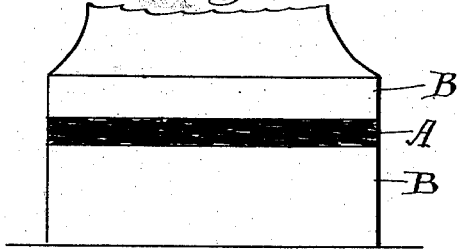

No. 743,031. Patented November 3, 1903.

UNITED STATES PATENT OFFICE.

GEORGE T. PRATT, OF WESTBROOK, MAINE.

INSULATING MATERIAL.

SPECIFICATION forming part of Letters Patent No. 743,031, dated November 3, 1903.

Application filed January 24, 1902. Serial No. 91,110. (No specimens.)

*To all whom it may concern:*

Be it known that I, GEORGE T. PRATT, a citizen of the United States of America, and a resident of Westbrook, Cumberland county, State of Maine, have invented certain new and useful Improvements in Insulating Material, of which the following is a specification.

My invention relates to an insulation material, such as is commonly used in electrical work; and the object of the invention is to produce a substance which will have a high degree of efficiency as an insulator and which shall at the same time have the necessary tensile strength, hardness, and toughness and which shall be waterproof.

The foundation of my material is leather-pulp formed into a suitable sheet by any well-known means, the leather-pulp having mixed with it a suitable strengthening fiber, such as sulfite wood-pulp. This sheet is lightly pressed when it is formed, so that after it has dried it will be as porous as possible, and it is then impregnated with an insulating substance which is preferably waterproof, such as mineral wax hardened with rosin and alum. After being impregnated with the insulating material the sheet is subjected to a heavy pressure.

In the accompanying drawings, Figures 1 and 2 represent a block of the material before and after it is impregnated, and Fig. 3 shows it after it has been compressed.

A represents a section of the sheet, and B B are the dies of the press.

In forming the sheet I mix, preferably, about seventy-five per cent. of the leather-pulp with about twenty-five per cent. of sulfite pulp to give it the necessary tensile strength. The sheet is formed on a paper-machine in the well-known manner, and it is pressed lightly as it runs through the rolls, so that after being dried it will be as porous as possible, so as to retain as much as possible of the impregnating material. After the sheet is formed it is dried and then dipped in the melted impregnating material, which in practice is composed of about seventy per cent. of ozocerite or mineral wax, twenty per cent. rosin, and ten per cent. of alum, these last two ingredients being used to harden the ozocerite and give the necessary hardness to the material.

An insulating material formed in this manner is found to be a very efficient insulator. It has the necessary hardness and strength, is easily worked, and is perfectly waterproof.

I claim—

1. The herein-described insulation material composed of a body of leather-pulp having a strengthening fiber mixed therewith and impregnated with mineral wax, rosin and alum.

2. The herein-described insulation material composed of a body of leather-pulp having sulfite wood-pulp mixed therewith and impregnated with mineral wax, rosin and alum.

Signed at Portland, Maine, this 22d day of January, 1902.

GEORGE T. PRATT.

Witnesses:
FRANK E. HAINES,
S. W. BATES.